United States Patent
Stravitz

(10) Patent No.: US 7,240,930 B2
(45) Date of Patent: Jul. 10, 2007

(54) QUICK-CONNECT/QUICK-DISCONNECT CONDUIT CONNECTORS

(76) Inventor: David M. Stravitz, 16 Park Ave., Suite 14A, New York, NY (US) 10016

( * ) Notice: Subject to any disclaimer, the term of this patent is extended or adjusted under 35 U.S.C. 154(b) by 0 days.

(21) Appl. No.: 10/785,531

(22) Filed: Feb. 23, 2004

(65) Prior Publication Data

US 2005/0184523 A1    Aug. 25, 2005

(51) Int. Cl.
*F16L 21/00*    (2006.01)
*F16L 55/00*    (2006.01)

(52) U.S. Cl. .................. 285/419; 285/148.26; 285/420; 285/903; 285/409

(58) Field of Classification Search .............. 285/409, 285/419, 420, 903, 373, 148.22, 148.23, 285/148.25, 148.26
See application file for complete search history.

(56) References Cited

U.S. PATENT DOCUMENTS

| | | | |
|---|---|---|---|
| 142,388 A * | 9/1873 | Goble | 285/398 |
| 177,361 A * | 5/1876 | Stanton | 285/325 |
| 210,560 A | 12/1878 | Robertshaw | |
| 1,020,002 A * | 3/1912 | Warner | 285/403 |
| 2,804,095 A | 8/1957 | Schauenburg | |
| 3,239,254 A * | 3/1966 | Campbell | 285/390 |
| 3,551,007 A * | 12/1970 | Martin et al. | 285/133.11 |
| 3,711,632 A * | 1/1973 | Ghirardi | 174/135 |
| 3,801,141 A * | 4/1974 | Hollingsworth | 285/236 |
| 4,008,937 A * | 2/1977 | Filippi | 439/192 |
| 4,101,151 A | 7/1978 | Ferguson | |
| 4,142,743 A * | 3/1979 | McGowen et al. | 285/148.26 |
| 4,261,600 A * | 4/1981 | Cassel | 285/148.26 |
| 4,273,367 A * | 6/1981 | Keeney et al. | 285/419 |
| 4,380,348 A | 4/1983 | Swartz | |
| 4,443,031 A * | 4/1984 | Borsh et al. | 285/419 |
| 4,660,870 A * | 4/1987 | Donley | 285/419 |
| 4,790,574 A * | 12/1988 | Wagner et al. | 285/419 |
| 4,795,197 A | 1/1989 | Kaminski | |
| 5,015,013 A | 5/1991 | Nadin | |
| 5,199,747 A | 4/1993 | Jahr | |
| 5,201,554 A | 4/1993 | Gagg et al. | |
| 5,318,328 A | 6/1994 | Dawson | |
| 5,335,945 A | 8/1994 | Meyers | |
| 5,351,996 A * | 10/1994 | Martin | 285/64 |
| 5,586,367 A | 12/1996 | Benoit | |
| 5,758,693 A | 6/1998 | Caine | |
| 6,398,270 B1 * | 6/2002 | Fukui et al. | 285/373 |

(Continued)

OTHER PUBLICATIONS

Continuation-in-Part U.S. Appl. No. 10/839,898, filed May 5, 2004; Inventor: David M. Stravitz; Title: "Quick-Connect/Quick-Disconnect Conduit connectors".

*Primary Examiner*—James M. Hewitt
(74) *Attorney, Agent, or Firm*—Frishauf, Holtz, Goodman & Chick, P.C.

(57) ABSTRACT

Connector for connecting a pair of tubular components together, such as a pair of exhaust conduits of a dryer or an exhaust conduit of a dryer to a dryer vent or wall-mounted vent sleeve, including a pair of generally semi-cylindrical members each having a first, coupled edge and a second, free edge and rotatably connected together at the coupled edge, e.g., by a hinge, and separable from one another at the free edge. A quick connect/quick disconnect locking structure is arranged in connection with the semi-cylindrical members for locking them to one another with the free edges opposite one another.

33 Claims, 13 Drawing Sheets

U.S. PATENT DOCUMENTS 6,811,191 B2 * 11/2004 Mills .......................... 285/409
6,899,359 B2 *  5/2005 Presby ....................... 285/420
2004/0061335 A1 *  4/2004 Mills .......................... 285/409
2005/0184524 A1 *  8/2005 Stravitz ...................... 285/903

* cited by examiner

US 7,240,930 B2

QUICK-CONNECT/QUICK-DISCONNECT CONDUIT CONNECTORS

FIELD OF THE INVENTION

The present invention relates generally to quick connect/quick disconnect connectors for connecting a pair of tubular components together, and more particularly, to such connectors for connecting together exhaust conduits of a clothes dryer or any other type(s) of conduits.

The present invention also relates to connectors for connecting flexible tubular components (such as conduits) to rigid tubular components, and more particularly, to such connectors for connecting an exhaust conduit to a dryer vent of a clothes dryer and/or to a vent pipe or other vent member.

BACKGROUND OF THE INVENTION

In the fluid conveyance art, there is a need for connectors which connect a pair of flexible or non-flexible fluid-conveying conduits together and which connect a flexible conduit to a rigid pipe or pipe-shaped member. For example, to vent exhaust air from a clothes dryer, the clothes dryer is usually installed with a flexible conduit extending between a rigid vent or exhaust pipe member on the dryer and a rigid vent sleeve mounted in an exterior wall of a building in order to provide a passage for the exhaust air from the dryer to the exterior of the building. Depending on the distance between the dryer vent and the wall-mounted vent sleeve, it may be necessary to use multiple conduits and connect the conduits together.

A variety of connectors which function to fulfill this need are known in the art. FIG. 1 shows one type of connector 100 which is used to connect a flexible exhaust conduit 102 for a dryer 104 to the dryer vent member 106. The connector 100 is rigid and may be made of PVC (polyvinylchloride) or other suitable material and is forcibly mounted (i.e., press fitted) to the dryer vent member 106. To install the connector 100 to the dryer vent member 106, the conduit 102 must be held straight to enable the screw-on attachment of the connector 100 to the conduit 102.

Also shown in FIG. 1 as well as in FIG. 2 is a known connector 108 for connecting a pair of exhaust conduits 102, 110 together. The exhaust conduit 110 is connected at one end to the connector 108 and at the opposite end to a vent sleeve 112 associated with an outside wall vent 114 and a flap valve 116. The connection of the exhaust conduit 110 to the vent sleeve 112 may be made by a clamp 118.

The connector 108 is a rigid tubular member and may be made of PVC. As shown in FIG. 2, the inner surface of the connector 108 is provided with thread members 120 which engage with the helical metal reinforcement members 122 of the exhaust conduits 102, 110 to thereby secure the exhaust conduits 102, 110 to the connector 108. Accordingly, a twisting action is required in order to connect each of the exhaust conduits 102, 110 to the connector 108.

A problem with this type of connector 108 arises when the exhaust conduit 102 is connected first to the dryer vent member 106 and then to the connector 108 and the exhaust conduit 110 is connected first to the vent sleeve 112 and then to the connector 108. Specifically, since the connector 108 and exhaust conduits 102, 110 must be twisted relative to one another in order to engage the connector 108 with the exhaust conduits 102, 110, kinking of one or both of the exhaust conduits 102, 110 may occur since the ends of the exhaust conduits 102, 110 opposite to the connector 108 are fixed. Also, the twisting engagement of the conduits 102, 110 to the connector 108 is difficult to accomplish.

Another type of connector consists of a circular clamp adapted to attach a flexible exhaust conduit to an exhaust pipe of a dryer, and can also be used to attach a large-diameter end of a flexible exhaust conduit to a smaller-diameter end of another flexible conduit. The circular clamp consists of a narrow metal band which fits around the exhaust conduit and is tightened by turning a machine screw with a screwdriver. Another type is a circular spring clamp which fits over the conduit. The clamps are used to clamp the exhaust conduit directly to the exhaust pipe.

These types of clamps are difficult to use because dryers are often installed with minimal working space around the exhaust pipe. Typically, the metallic exhaust pipe at the rear of a dryer terminates substantially flush with the back of the dryer, and the dryer back has a shallow circular depression around the exhaust pipe. In order to use one of these known clamps, the clamp must first be placed over the conduit and then the conduit must be placed over the end of the exhaust pipe. The exhaust conduit fits over the pipe and, because there is little working room, it is hard to slide the conduit onto the pipe to allow secure clamping. Furthermore, after the conduit is on the pipe, a clamp must be moved into place and when present, the machine screw must be tightened. However, a screwdriver cannot be aligned with the machine screw, because the clamp must be inside the plane of the dryer back in order to clamp the conduit on the pipe. Thus, the screwdriver must be held off line to tighten the screw while holding the conduit and clamp on the pipe. This installation procedure is awkward and frequently results in an insecure clamping which can lead to the conduit slipping off of the exhaust pipe later when the dryer is vibrating during an operating cycle.

Installation of the known spring clamp entails gripping the clamp with pliers to hold it open while it is being moved into position so as to clamp the conduit on the exhaust pipe. This is also a difficult feat which produces the same disadvantageous results as the first type of clamp described.

Another connector device for coupling an exhaust conduit to an exhaust pipe of a dryer is described in U.S. Pat. No. 5,318,318 to Dawson. Dawson describes a quick-connect device which includes a tubular member having a female end portion with magnetic material to magnetically couple to the exhaust pipe of the dryer and a male end portion which threadingly engages with the exhaust conduit. Dawson does not disclose a connector for connecting a pair of exhaust conduits together.

U.S. Pat. No. 4,795,197 to Kaminski et al. describes a connector which may be used to connect two flexible conduits together. The connector includes two semi-cylindrical portions, with an integral hinge and locking structure so that when locked together, a cylindrical member is formed. The inner surface of the cylindrical member is corrugated to correspond to corrugations on the flexible conduits to prevent the conduits from being released from the connector once the semi-cylindrical members are locked to one another.

OBJECTS AND SUMMARY OF THE INVENTION

Accordingly, it is an object of the present invention to provide a quick connect device that constitutes a simple economical, fast and secure means for coupling or attaching an exhaust conduit to the dryer vent or exhaust pipe of a clothes dryer or the like, and which also is easily and quickly detachable from such a conduit.

It is another object of the present invention to provide a connector for connecting conduits together which does not require twisting of any of the conduits and thereby avoids the potential for kinking of the conduits and/or damaging the free ends of the conduits during the connecting procedure.

In order to achieve these objects and others, one embodiment of a connector for connecting a pair of tubular components together in accordance with the invention generally comprises a pair of generally semi-cylindrical members each having a first, coupled edge and a second, free edge and rotatably connected together at the coupled edge, e.g., by a hinge, and separable from one another at the free edge, and a quick connect/quick disconnect locking structure arranged in connect-ion with the semi-cylindrical members for locking them to one another with the free edges opposite one another.

Various quick connect/quick disconnect locking structure are envisioned, including a locking lever pivotally arranged on one semi-cylindrical member and a tension lever connected thereto, and a projection formed on the other semi-cylindrical members and including a groove. The locking lever is designed to pivot about a pivot axis defined by a mounting bracket to enable the tension lever to engage with the groove. Once the tension lever is engaged in the groove, by depressing the locking lever, the free edges are brought opposite one another, and possibly in contact with one another.

Locking flanges are preferably provided on inner surfaces of one or both of the semi-cylindrical members to engage with the tubular components. The locking flanges thus enhance the attachment of the connector to the tubular components. To limit penetration of the tubular components into the connector, a divider flange may also be formed on the inner surfaces of the semi-cylindrical members and is provided with a larger height than the locking flanges.

The connector can be designed to connect tubular components having different diameters together. In this case, the semi-cylindrical members are each provided with a first engagement portion having one radius of curvature adapted to engage with one tubular component and a second engagement portion having a different radius of curvature and adapted to engage with the other tubular component.

This type of connector is particularly useful for connecting an exhaust conduit for a dryer to the dryer vent which projects from a rear of the dryer since the exhaust conduit usually has a larger diameter than the dryer vent. In this case, to facilitate the attachment of the conduit to the dryer vent, the larger engagement portion of one of the semi-cylindrical members is provided with an axially oriented extension portion contiguous therewith. This extension portion can then be held when installing the exhaust conduit to the dryer vent.

Another type of connector includes a C-shaped member made of flexible material, such as rubber, and having free edges and a quick connect/quick disconnect locking structure arranged in connection therewith for locking the free edges to one another. The member is capable of acting as its own hinge to enable free edges of the member to be displaced toward and away from one another.

Still another type of connector for connecting a pair of tubular components together includes an elongate strap of flexible material having opposite free edges and a quick connect/quick disconnect locking structure for locking the free edges together at different distances therebetween to thereby enable the strap to encircle tubular components having different sizes. The locking structure may include a pivotable tension lever arranged at one free edge and a projection arranged at the other free edge. The projection has several notches spaced at different distances from the free edge. As such, the tension lever can engage with any of the notches to thereby enable variation in the distance between the free edges of the strap.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 5:
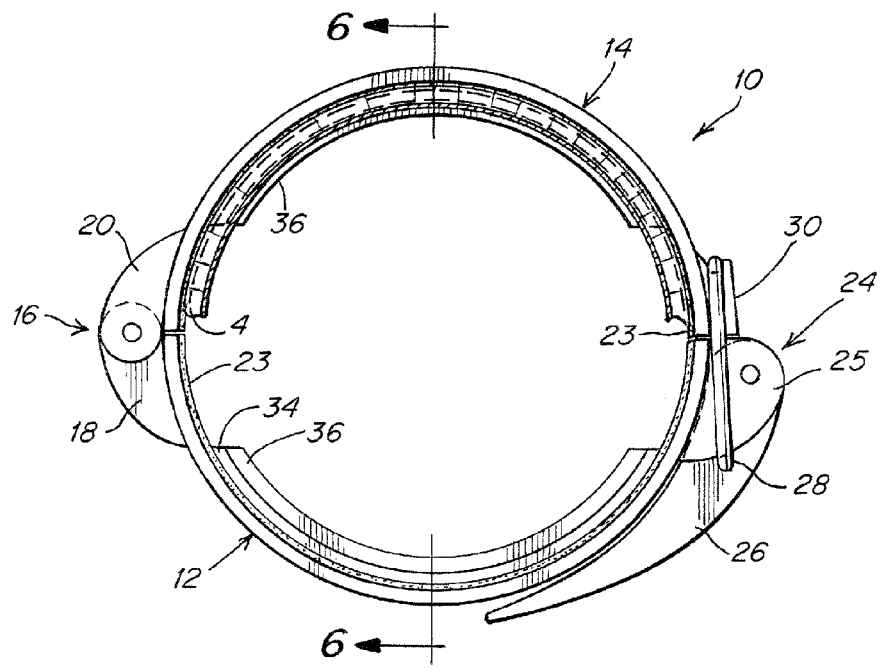
FIG. 5 is an end view, partly in section, of the connector of FIG. 3 fully engaged with the conduits as seen along the line 5—5 of FIG. 4.

Referring to the accompanying drawings wherein like reference numerals refer to the same or similar elements, a first embodiment of a connector for connecting a pair of conduits in accordance with the invention is designated generally as 10. The connector 10 includes a pair of generally semi-cylindrical members 12, 14 rotatably connected together at a first, coupled edge 12a, 14a and separable from one another at a second, free edge 12b, 14b. In this manner, the semi-cylindrical members 12, 14 have an open position in which the second edges 12b, 14b are separated from one another (as shown in FIG. 3) and a closed position in which the second edges 12b, 14b are adjacent one another (as shown in FIG. 5).

Figure 3:
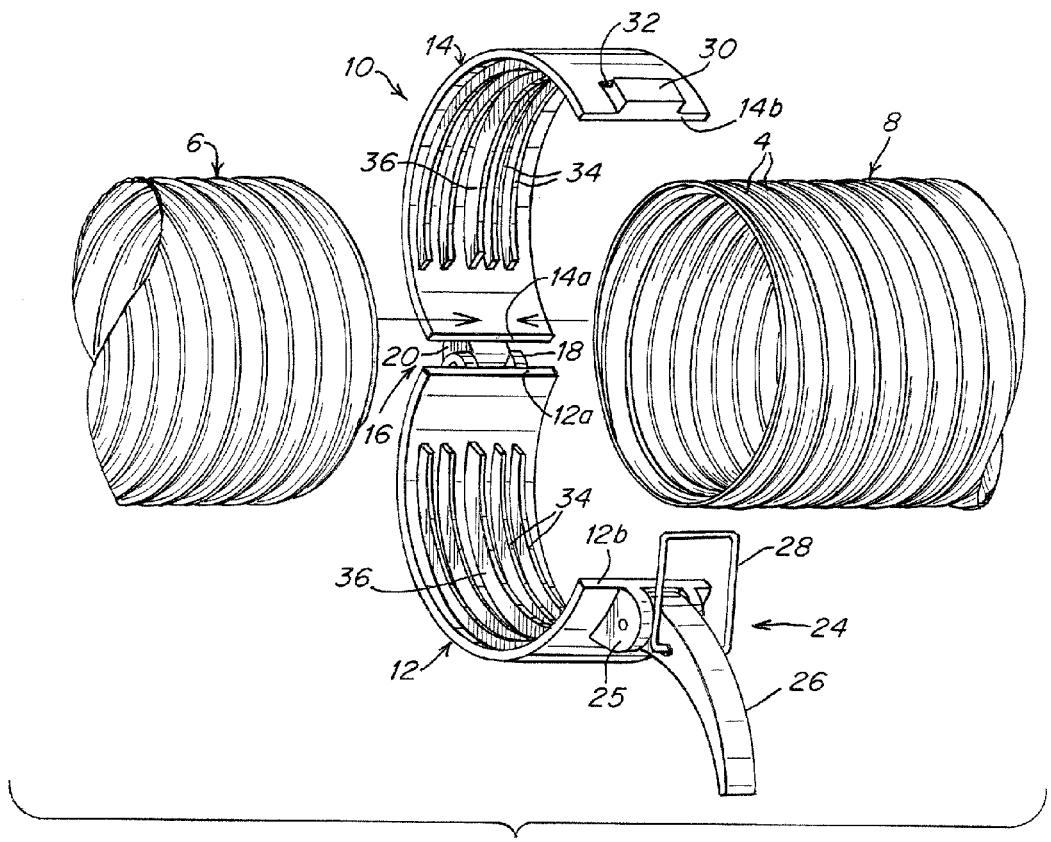
FIG. 3 is an exploded view of a first embodiment of a connector for connecting a pair of conduits together in accordance with the invention.

In the embodiment shown in FIG. 3, the semi-cylindrical members 12, 14 are connected together by a hinge 16 (i.e., connected at the first edges 12a, 14a). Hinge 16 may have any known structure in the art, for example, a first part 18 defining a pivot axis arranged on or integrally formed in connection with the semi-cylindrical member 12 and a second part 20 arranged on or integrally formed in connection with the semi-cylindrical member 14, the second part 20 being rotatably mounted on the pivot axis defined by the first hinge part 18.

Figure 3A:
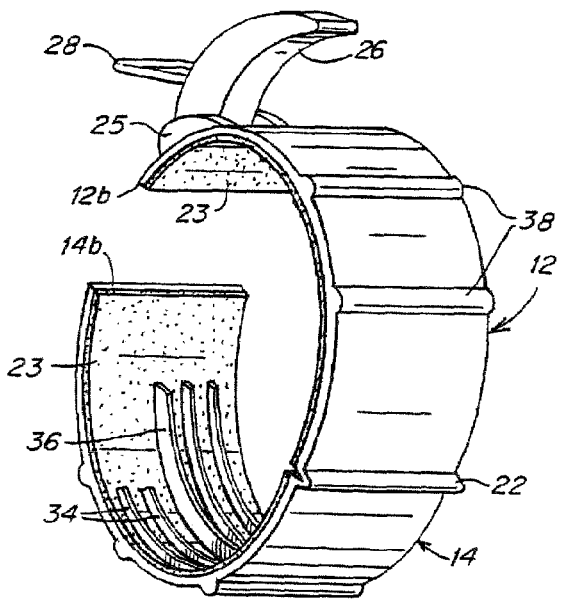
FIG. 3A is a perspective view of a modified embodiment of the connector of FIG. 3 wherein a living hinge is provided.

The semi-cylindrical members 12, 14 may also be integrally formed with a living hinge 22 as shown in FIG. 3A. FIG. 3A also shows the possibility of providing axially extending ridges 38 on the outer surface of the semi-cylindrical members 12, 14 and the presence of an optional sealing layer 23 arranged along an inner surface of the semi-cylindrical members 12, 14. Sealing layer 23 may be a foam layer which is formed separate from the semi-cylindrical members 12, 14 and adhered thereto or formed integral with the semi-cylindrical members 12, 14. Sealing layer 23 serves to create an air-tight seal when the connector 10 is coupling two tubular components together, i.e., to prevent air from passing through any gap that might be formed between the coupled ends of the tubular components. The sealing layer 23 may extend over the entire inner surfaces of the semi-cylindrical members 12, 14 or only part thereof, i.e., it may be formed in the shape of circumferentially extending strips.

The semi-cylindrical members 12, 14, with the hinge parts 18, 20 or living hinge 22, may be formed from a rigid material, such as PVC, another suitable moldable plastic material, such as Krayton™, or rubber.

Figure 4:
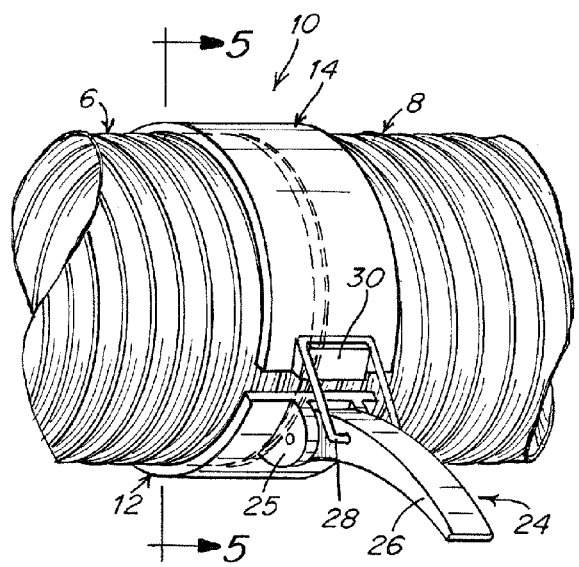
FIG. 4 is a perspective side view of the connector shown in FIG. 3 partially locked into the conduits.

The connector 10 also includes a looking structure 24 to enable the semi-cylindrical members 12, 14 to be securely locked to one another. As shown in FIGS. 3 and 4, the locking structure 24 includes a pivotable locking lever 26 arranged on the semi-cylindrical member 12 at the free edge 12b (the term "at" is used to mean on, near or proximate), a tension lever 28 connected to the locking lever 26, and a projection 30 formed on the semi-cylindrical member 14 with a groove 32 which opens toward, i.e., faces away from, the free edge 14b of the semicylindrical member 14. The locking lever 26 may be pivotally mounted to a mounting bracket 25 which is attached to the semi-cylindrical member 12.

The locking lever 26 is designed to enable the tension lever 28 to engage with the groove 32 so that when the locking lever 26 is then pivoted toward and against the semi-cylindrical member 12, the free edge 14b of the semi-cylindrical member 14 is brought toward and against the free edge 12b of the semi-cylindrical member 12 and the semi-cylindrical members 12, 14 are locked together (see FIG. 5). However, the locking of the semi-cylindrical members 12, 14 can be released by lifting the locking lever 26 and then releasing the tension lever 28 from the groove 32. Other locking structures to releasably lock the semi-cylindrical members 12, 14 together may be used in the invention.

The locking lever 26 and projection 30 may each be arranged on a platform on the outer surface of the semi-cylindrical members 12, 14. These platforms could be formed integral with the semi-cylindrical members 12, 14 or separate therefrom, i.e., formed in conjunction with the mounting bracket 25 or projection 30, and subsequently attached to the semi-cylindrical members 12, 14.

Figure 3B:
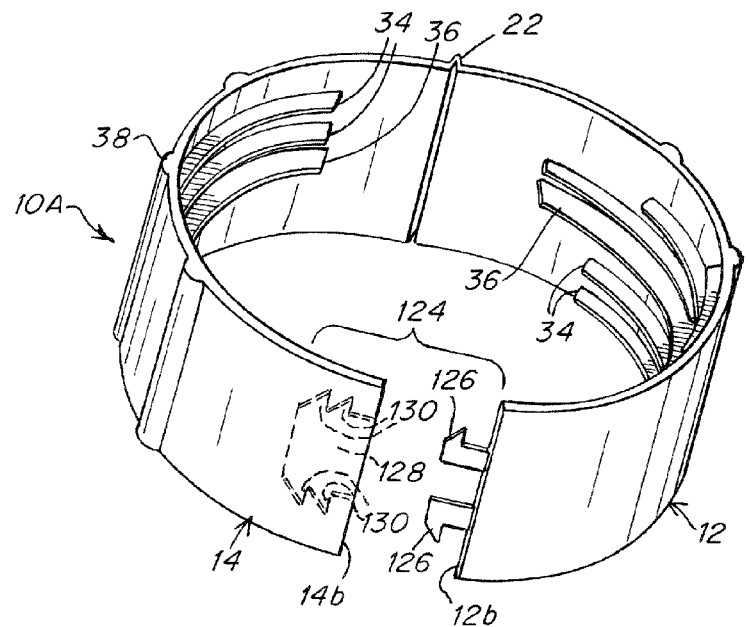
FIGS. 3B and 3C are perspective views of a further modified embodiment of the connector shown in FIG. 3 with an alternative locking structure.
Figure 3C:
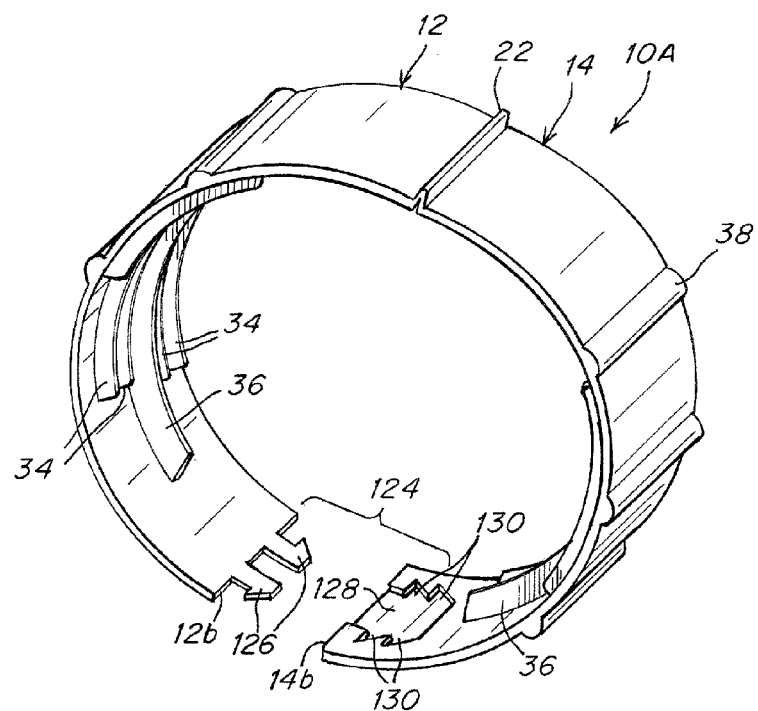

FIGS. 3B and 3C show a connector 10A with an alternative locking structure 124 which includes a pair of hook-shaped locking projections 126 formed on semi-cylindrical member 12 and a channel 128 formed on an inner surface of semi-cylindrical member 14 and receivable of the locking projections 126. The locking projections 126 project outward from the free edge 12b of the semi-cylindrical member 12 and are spaced apart from one another to enable them to flex relative to one another in order to be inserted into the channel 128. The channel 128 includes one or more pairs of side recesses 130. Rear-facing surfaces of the locking projections 126 engage with a pair of recesses 130 upon closure of the semi-cylindrical members 12, 14 such that when the locking projections 126 are engaged in the channel 128, they cannot be easily removed therefrom and the semi-cylindrical members 12, 14 are thereby locked together.

Figure 3D:
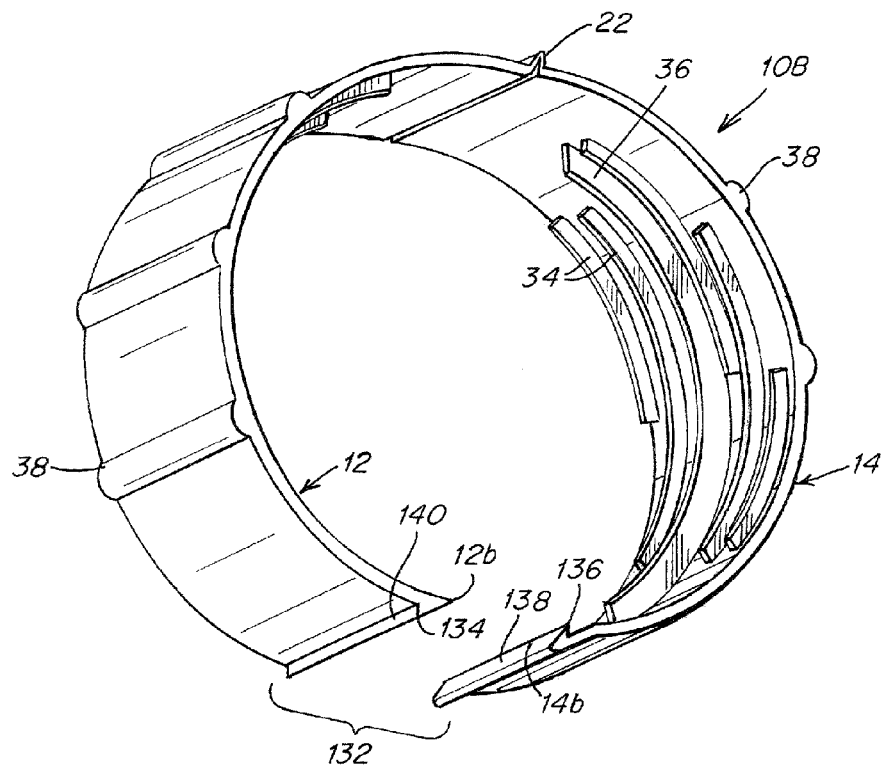
FIG. 3D is a perspective view of another modified embodiment of the connector shown in FIG. 3 with an alternative hinge and locking structure.
Figure 3E:
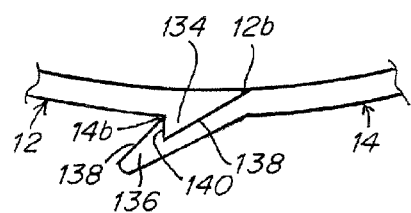
FIG. 3E is an enlarged view of the locking structure of the connector shown in FIG. 3D.

Another locking structure is shown in a connector 10B in FIG. 3D. This locking structure 132 includes a raised, outwardly oriented lip 134 formed at the free edge 12b of the semi-cylindrical member 12 and a raised, inwardly oriented lip 136 formed at the free edge 14b of the semi-cylindrical member 14. Each lip 134, 136 has a sloping forward-facing surface 138 and a planar rearward-facing surface 140 and the free edges 12b, 14b of the semi-cylindrical members 12, 14 are connected together by urging the raised lip 136 over the raised lip 134 to obtain the locking position shown in FIG. 3E.

Figure 3F:
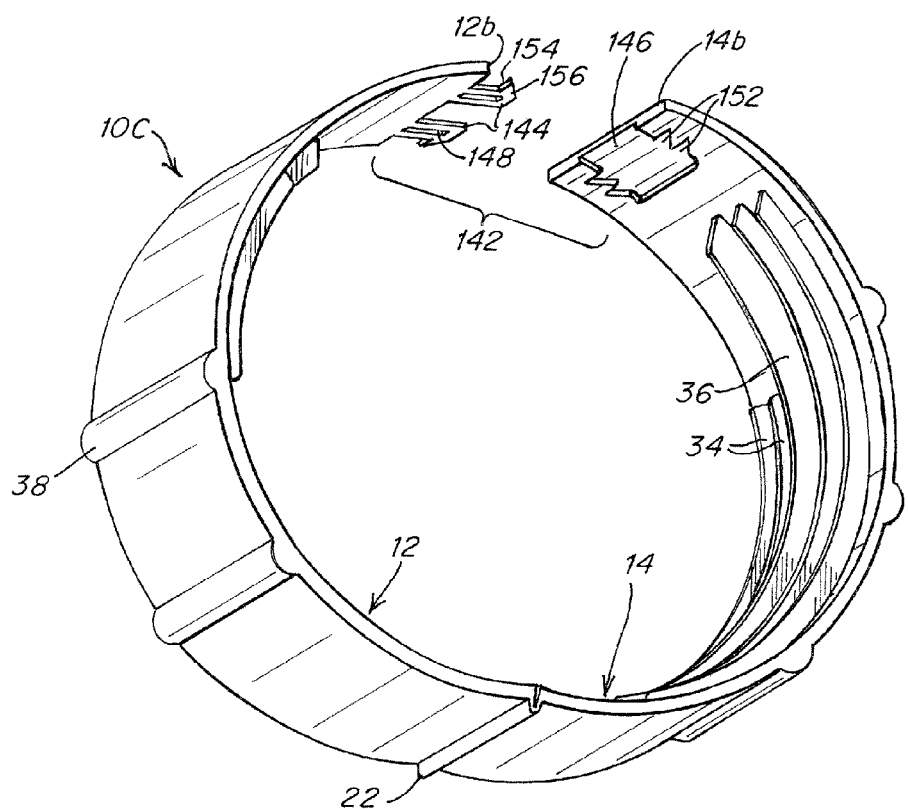
FIG. 3F is a perspective view of a further modified embodiment of the connector shown in FIG. 3 with an alternative locking structure.

Still another locking structure is shown in a connector 10C in FIG. 3F. This locking structure 142 includes a pair of hook-shaped locking projections 144 formed on semi-cylindrical member 12 and a cavity 146 extending inward from an outer surface at the free edge 14b of semi-cylindrical member 14. Cavity 146 is receivable of the locking projections 144.

The locking projections 144 project outward from the free edge 12a of the semi-cylindrical member 12 and are spaced apart from one another to enable them to flex relative to one another in order to be inserted into the cavity 146. Also, each locking projection 144 includes an opening 148 therein to provide them with a certain degree of flexibility to enable them to be inserted into the cavity 146.

Figure 3G:
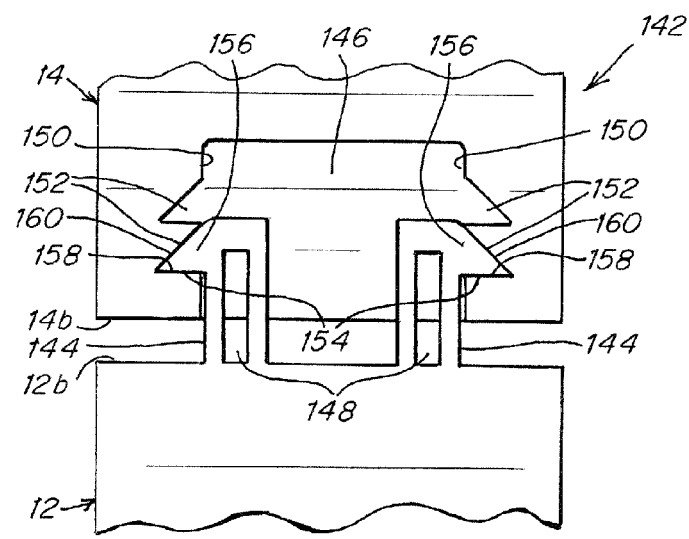
FIG. 3G is a sectional view of the connector shown in FIG. 3F through the locking structure.

As shown in FIG. 3G, side walls 150 of the cavity 146 include indentations 152. A portion 156 of the locking projections 144 is inserted into each indentation 152 with a rear-facing surface 154 of the locking projections 144 abutting against a surface 158 of the indentations 154 upon closure of the semi-cylindrical members 12, 14. The locking projections 144 include sloping forward-facing surfaces 160 which contact the side walls 150 of the cavity 146 upon insertion of the locking projections 144 into the cavity 146 which causes the locking projections to flex inward. When the locking projections 144 are engaged with the indentations 152, they cannot be easily removed therefrom and the semi-cylindrical members 12, 14 are thereby locked together.

As can be seen in FIG. 3G, it is possible to provide multiple pairs of opposed indentations 152 in the side walls 150 of the cavity 146. In this manner, the connector 142 can couple tubular components having varying diameters together, i.e., two tubular components having a 3" diameter or possibly two tubular components having a 3.5" diameter, depending on which indentations 152 the locking projections 144 are engaged with. In the former case, the circumference of the connector 142 would be smaller and thus the locking projections 144 would be placed in the innermost pair of indentations 152 whereas in the latter case, the circumference of the connector 142 would be larger and thus the locking projections 144 would be placed in the outermost pair of indentations 152.

Figure 3H:
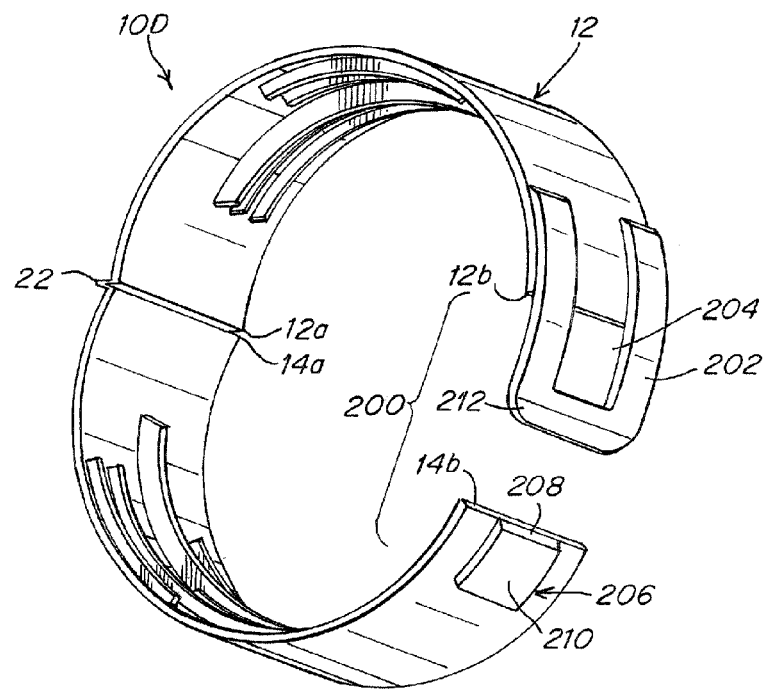
FIG. 3H is a perspective view of another modified embodiment of the connector shown in FIG. 3 with an alternative hinge and locking structure shown in an unlocked state.
Figure 3I:
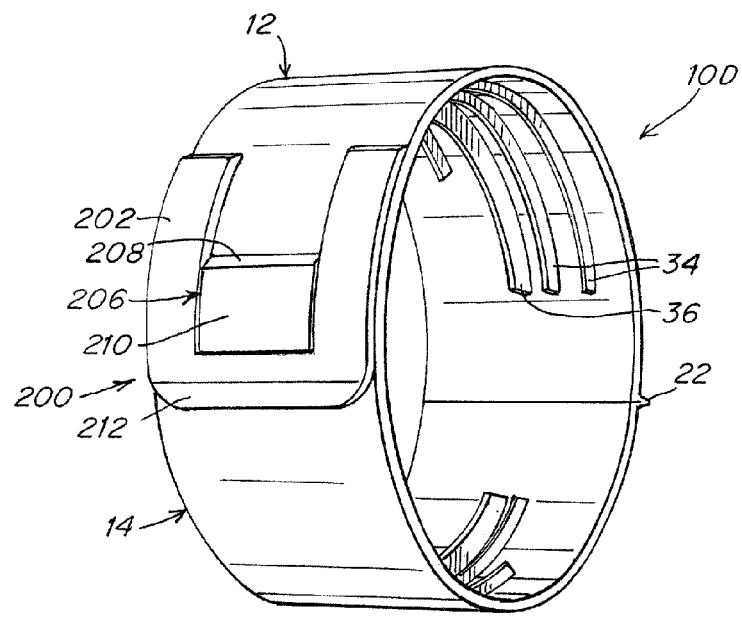
FIG. 3I is a perspective view of the connector shown in FIG. 3H shown in a locked state.

Still another locking structure is shown in a connector 10D in FIGS. 3H and 3I. This locking structure 200 includes a substantially U-shaped flange 202 defining an opening 204 formed on semi-cylindrical member 12 and extending beyond the free edge 12b thereof, and a projection 206 formed on an outer surface at the free edge 14b of semi-cylindrical member 14. Projection 206 is receivable in the opening 204 to thereby lock the semi-cylindrical members 12, 14 to one another (see FIG. 3I). Flange 202 may have additional forms and shapes which define an opening other than that shown in FIGS. 3H and 3I.

Flange 202 and projection 206 may be formed integral with the respective semi-cylindrical members 12, 14, along with the living hinge 22, so that the connector 10D is a unitary component, i.e., has a one-piece construction.

When locking the semi-cylindrical members 12, 14 about a pair of tubular components, the free edge 12b, 14b of one of the semi-cylindrical members 12, 14 is brought toward the other until the flange 202 engages the projection 206. The flange 202 may be designed to be flexible to enable it to be manually lifted over the projection 206 and snapped down thereafter with the projection 206 being accommodated in the opening 204. Alternatively, the flange 202 is pressed against an angled surface 208 of the projection 206, which faces the free edge 14b, and is thereby caused to flex slightly outward and be deflected upward onto the upper surface 210 of the projection 206. Flange 202 continues its movement along the upper surface 210 of the projection 206 until it snaps down after passing over the entire projection 206 with the projection 206 then being accommodated in the opening 204 defined by the flange 202.

To facilitate lifting of the flange 202, the flange 202 may be formed with a lifting tab 212. Lifting tab 212 is angled upward to further aid in the deflection of the flange 202 upward when it contacts the angled surface 208 of the projection 206.

To release the locking structure 200, the flange 202 is lifted upward and the flange 202 and projection 206 are removed from engagement with each other. The semi-cylindrical members 12, 14 can then be pivoted about hinge 22 to separate the free edges 12b, 14b from one another. Also, it is possible to compress the semi-cylindrical member 14 to thereby urge the projection 206 inward and aid in the separation of the flange 202 and projection 206 from one another.

The locking structures 124, 134, 142 and 200 shown in FIGS. 3B–3I may be used in any of the connectors disclosed herein. In a similar manner, the other locking structures disclosed herein can be used in the connectors 10A, 10B, 10C and 10D shown in FIGS. 3B–3I.

Referring back to FIG. 3, locking flanges 34 are formed on the inner surfaces of the semi-cylindrical members 12, 14. The locking flanges 34 are designed to engage with grooves on the exhaust conduits 6, 8 which are formed between the metal reinforcement member(s) 4 (see FIGS. 5 and 6). The length of the locking flanges 34 may be varied as desired. If the conduits or other tubular components to be connected together by the connector 10 do not include grooves, then the locking flanges 34 would apply pressure to the outer surface of the tubular components to frictionally secure the connector 10 thereto.

A divider flange 36 is also formed on the inner surface of the semi-cylindrical members 12, 14 and has a larger height than the locking flanges 34, i.e., projects more inwardly than the locking flanges 34 (see FIG. 5). As such, the divider flange 36 serves as a stop to limit the penetration of the conduits 6,8 and thereby ensures that a sufficient length of each conduit 6,8 can be engaged with the connector 10 (see FIG. 6). The divider flange 36 may be, but does not have to be, arranged at an approximate midpoint of the axial length of the connector 10. When placed the axial midpoint of the connector 10, the same axial length of each conduits 6, 8 would be engaged with the connector 10.

Figure 6:
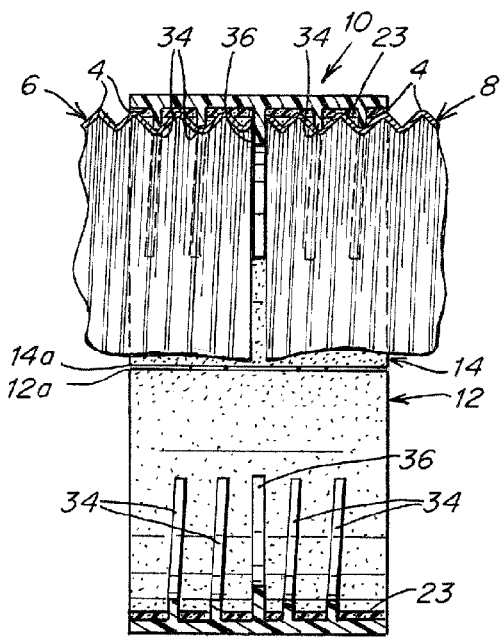
FIG. 6 is a cross-sectional side view taken along the line 6—6 of FIG. 5.

The divider flange 36 can be arranged substantially parallel to the axial ends of the connector 10 while the locking flanges 34 may be arranged at an angle to the axial ends of the connector 10 (as shown in FIG. 6). In the alternative, the locking flanges 34 may also be arranged parallel to the axial ends of the connector 10.

As shown in FIGS. 5 and 6, the locking flanges 34 and divider flange 36 extend through the sealing layer 23.

The connector 10 is constructed such that the diameter of the inner cylindrical surface thereof is substantially the same as the outer diameter of the conduits 6, 8 to be connected together (see FIG. 6).

To connect conduits 6, 8 together using the connector 10, the semi-cylindrical members 12, 14 are arranged in an unlocked configuration such as shown in FIG. 3. The conduits 6, 8 are then placed onto the locking flanges 34 on the semi-cylindrical member 12, on a respective side of the divider flange 36, and such that the locking flanges 34 are placed into the grooves in the conduits 6, 8. The conduits 6, 8 may be arranged such that they abut and contact the divider flange 36. Thereafter, the semi-cylindrical member 14 is brought into engagement with the conduits 6, 8 such that the locking flanges 34 of the semi-cylindrical member 14 are placed into the grooves in the conduits 6, 8. The tension lever 28 is, from the position shown in FIG. 3, then placed into the groove 32 of the projection 30 on the semi-cylindrical member 14. The tension lever 26 is then pressed downward causing the free edge 14b of the semi-cylindrical member 14 and the free edge 12b of the semi-cylindrical member 12 to move toward one another and lock the semi-cylindrical members 12, 14 together and thereby connect the conduits 6, 8 together. Twisting of the conduits 6, 8 or the connector 10 is not required during the connection of the conduits 6,8 together.

Figure 1:
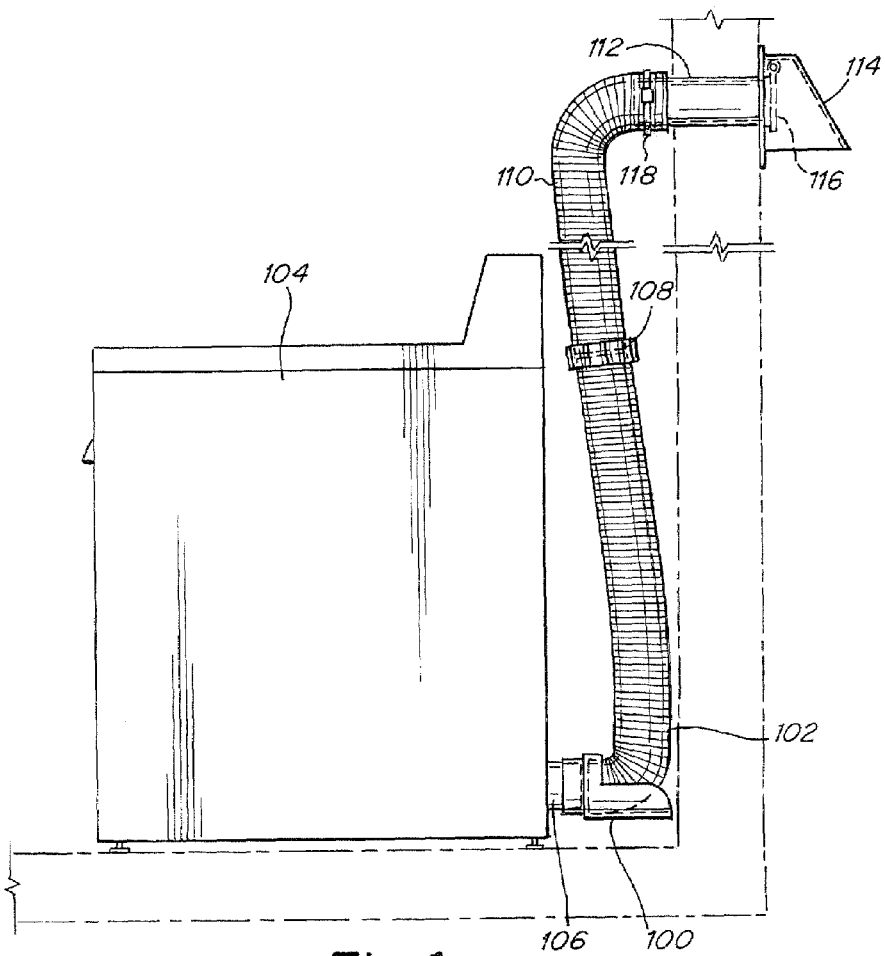
FIG. 1 is a schematic side view of a prior art clothes dryer vent arrangement.
Figure 2:
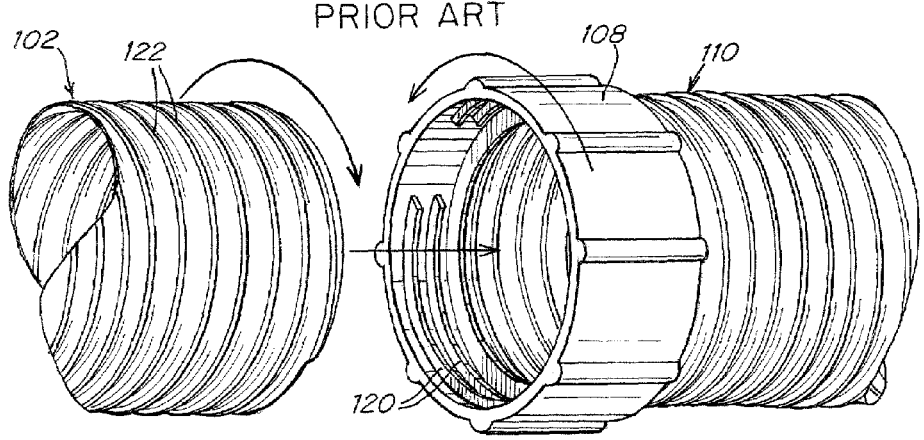
FIG. 2 is a partially exploded view of a typical prior art connector which connects the pair of exhaust conduits of the vent arrangement shown in FIG. 1.
Figure 7A:
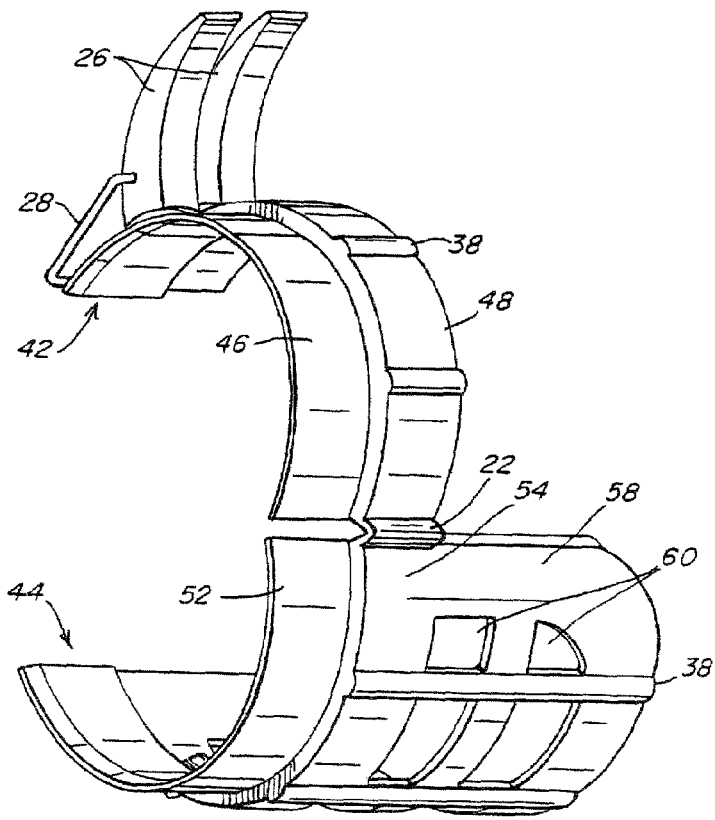
FIG. 7A is a perspective view of a modified embodiment of the connector of FIG. 7 wherein a living hinge is provided.
Figure 7:
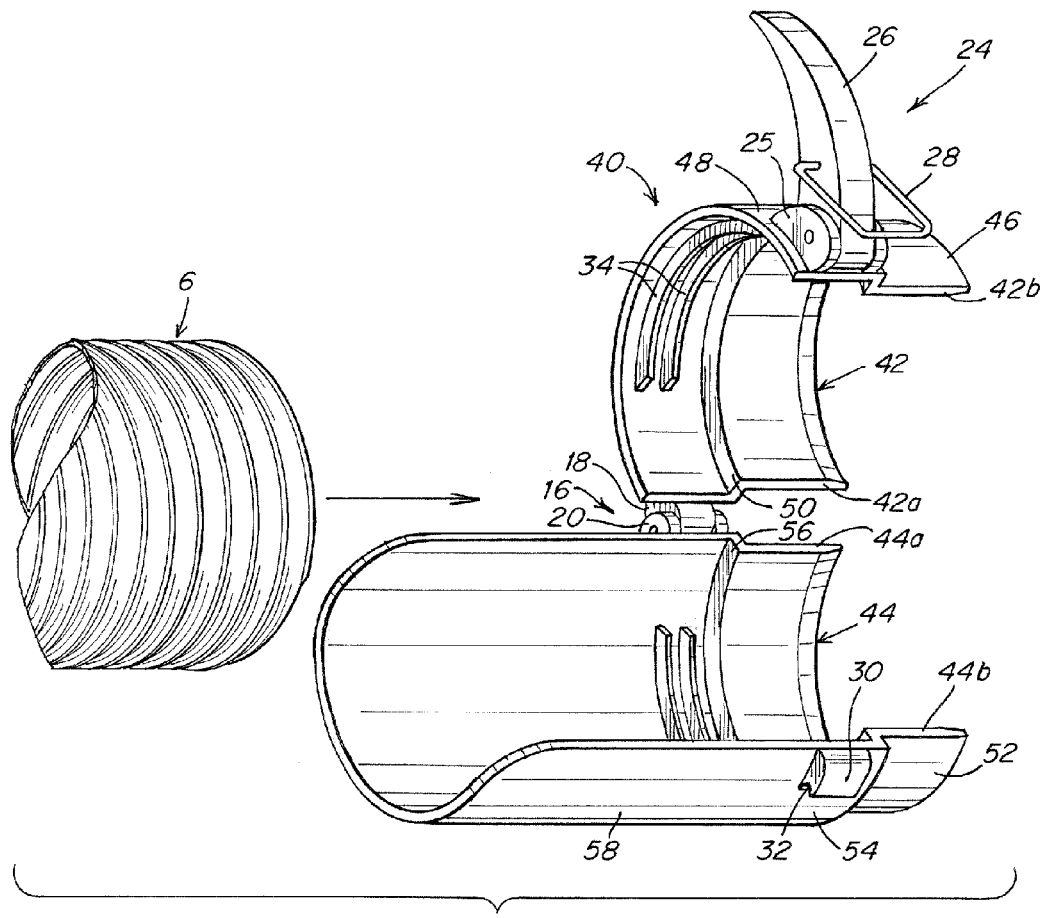
FIG. 7 is an exploded perspective view of a connector in accordance with the invention which may be used to connect a conduit to a vent of a dryer.
Figure 8:
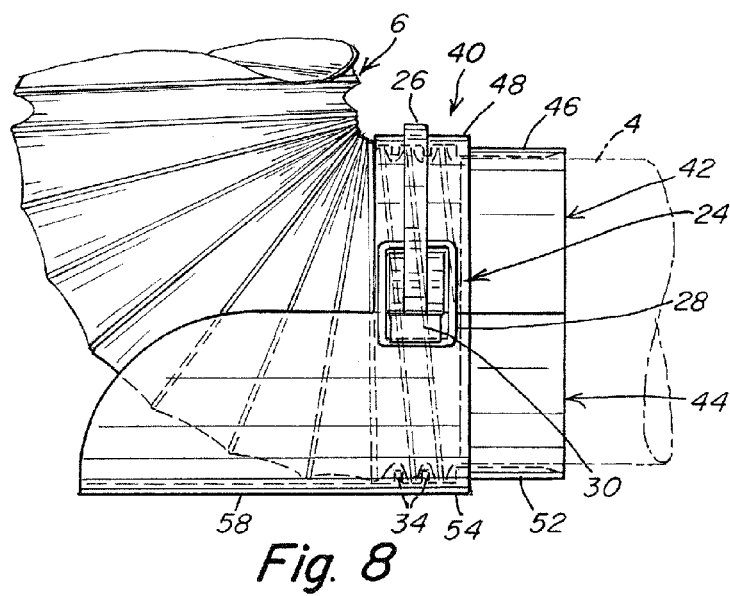
FIG. 8 is a side view on the connector shown in FIG. 7 and a conduit installed in connection with the dryer vent.

Referring now to FIGS. 7, 7A and 8, a connector for connecting a conduit 6 to a dryer vent 4 is designated generally as 40. Connector 40 does not require a screw-on attachment to the dryer vent 4 as in the prior art, as discussed above with reference to FIG. 1. As a result, the conduit 6 does not have to be held straight when attaching the conduit 6 to the dryer vent 4 and indeed, it becomes possible to bend the conduit 6 into engagement with the connector 40 and then close the connector 40 around the conduit 6 and the dryer vent 4.

The connector 40 includes a pair of generally semi-cylindrical members 42, 44 rotatably connected together at a first, coupled edge 42a, 44a and separable from one another at a second, free edge 42b, 44b. The semi-cylindrical members 42, 44 thus have an open position in which the second edges 42b, 44b are separated from one another (as shown in FIG. 7) and a closed position in which the second edges 42b, 44b are adjacent one another (as shown in FIG. 8).

The semi-cylindrical member 42 includes a first engagement portion 46 adapted to engage with the dryer vent 4 and a second engagement portion 48 adapted to engage with the conduit 6. An arcuate lip 50 is formed between the engagement portions 46, 48 and is perpendicular to an axis passing through the connector 40. Similarly, the semi-cylindrical member 44 includes a first engagement portion 52 adapted to engage with the dryer vent 4 and a second engagement portion 54 adapted to engage with the conduit 6. An arcuate lip 56 is formed between the engagement portions 52, 54 and is perpendicular to the axis passing through the connector 40. The arcuate lips 50, 56 limit the penetration of the conduit 6 into the connector 40.

In view of a relative size differential between the dryer vent 4 and a standard conduit 6, vent engagement portions 46, 52 have a smaller radius of curvature than conduit engagement portions 48, 54. However, the ratio of the radii of curvature may vary depending on the size differential between the two components being coupled together by the connector 40.

The conduit engagement portion 54 is formed integral and contiguous with an axially oriented extension portion 58 of the connector 40. Extension portion 58 is provided to enable the installer of the conduit 6 to grab hold of the connector 40 when the connector 40 is coupled to the conduit 6.

In the embodiment shown in FIG. 7, the semi-cylindrical members 42, 44 are connected together by a hinge 16 (i.e., connected at the first edges 42a, 44a), which has essentially the same structure as described above. The first part 18 of the hinge 16 is arranged on or integrally formed in connection with the semi-cylindrical member 42 while the second part 20 of the hinge 18 is arranged on or integrally formed in connection with the semi-cylindrical member 44.

The semi-cylindrical members 42, 44 may also be integrally formed with a living hinge 22 as shown in FIG. 7A. Living hinge 22 may be formed only at the conduit engagement portions 48, 54 as shown or, alternatively or additionally at the vent engagement portions 46, 52.

FIG. 7A also shows the possibility of providing axially extending ridges 38 on the outer surface of the semi-cylindrical members 42, 44, specifically the conduit engagement portion 48 of semi-cylindrical member 42 and the conduit engagement and extension portions 54, 58 of semi-cylindrical member 44. Also the extension portion 58 is provided with openings 60 which can be made without subtracting from the strength of the connector 40. From FIG. 7, it can also be seen that locking flanges 34 are provided on only the conduit engagement portions 48, 54 and are spaced apart from the free, axial edges of the respective conduit engagement portion 48, 54. Moreover, it can be seen In FIG. 7A that extension portion 58 extends axially outward from conduit engagement portion 54 in a direction away from vent engagemeni portion 52 to thereby provide semi-cylindrical member 44 with a larger axial length than semi-cylindrical member 12, which lacks such an extension portion. In view of this axial length variation, a conduit 6 engaging with semi-cylindrical members 42, 44 via conduit engagement portions 48, 54 can be bent away from the extension portion 58 (see FIG. 8).

The semi-cylindrical members 42, 44, with the hinge parts 18, 20 or living hinge 22, may be formed from a rigid material such as PVC, rubber or another suitable plastic material.

The connector 40 also includes the locking structure 24, described above, arranged on the conduit engagement portions 48, 54 of the semi-cylindrical members 42, 44. Alternatively or additionally, a locking structure 24 can be arranged on the vent engagement portions 46, 52 of the semi-cylindrical members 42, 44. For each locking structure 24, the pivoting lever 26 and connected tension lever 28 can be arranged on either semi-cylindrical member 42, 44 with the projection 30 on the other semi-cylindrical member 42,44. Other locking structures to releasably lock the semi-cylindrical members 42, 44 together, as described elsewhere herein, may be used in the invention.

Locking flanges 34 are formed on the inner surfaces of the conduit engagement portions 48, 54 of the semi-cylindrical members 42, 44. The locking flanges 34 are designed to engage with grooves on the exhaust conduit 6 (see FIG. 8). Locking flanges 34 may be arranged at an angle or parallel to the axial ends of the connector 40.

To connect conduit 6 to the dryer vent 4 using the connector 40, the semi-cylindrical members 42, 44 are arranged in an unlocked configuration such as shown in FIG. 7. Semi-cylindrical member 44 is placed under the dryer vent 4 such that the dryer vent 4 is adjacent the vent engagement portion 52. The conduit 6 is engaged with the locking flanges 34 of the conduit engagement portion 54 of the semi-cylindrical member 44, such that the locking flanges 34 are placed into grooves in the conduit 6, and can be bent if the space between the rear of the dryer and the adjoining wall is insufficient. Thereafter, the semi-cylindrical member 42 is brought into engagement with the dryer vent 4 and the conduit 6 such that the locking flanges 34 of the conduit engagement portion 48 of the semi-cylindrical member 42 are placed into the grooves in the conduit 6 and the vent engagement portion 46 of the semi-cylindrical member 44 contacts the dryer vent 4. The tension lever 28 is then placed into the groove 32 of the projection 30 on the semi-cylindrical member 44. The tension lever 26 is then pressed toward the semi-cylindrical member 42 causing the free edge 44b of the semi-cylindrical member 44 and the free edge 42b of the semi-cylindrical member 42 to move toward one another and lock the semi-cylindrical members 42, 44 together and thereby securely connect the conduit 6 to the dryer vent 4.

Figure 9:
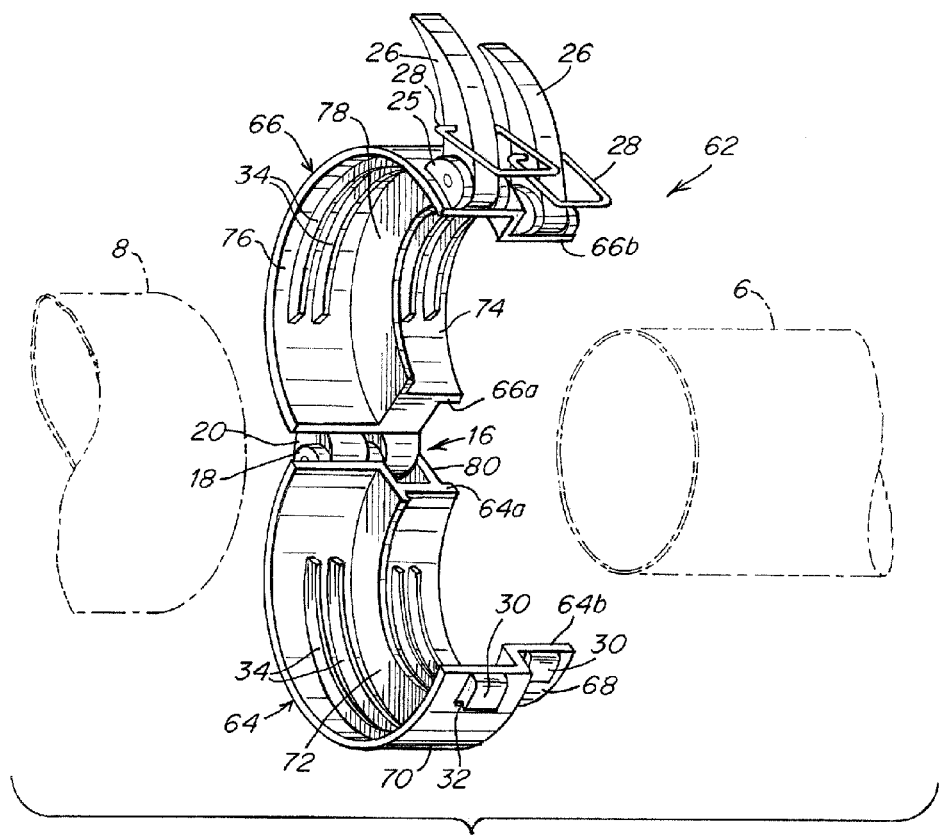
FIG. 9 is an exploded perspective view of a reducer connector in accordance with the invention.
Figure 10:
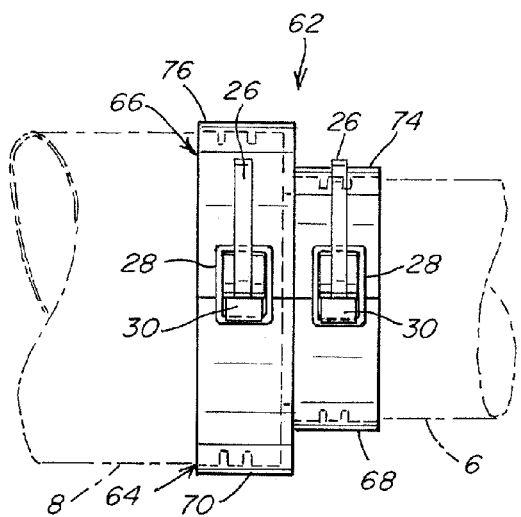
FIG. 10 is a side view of the reducer connector of FIG. 9 installed on a pair of conduits having different diameters.
Figure 9A:
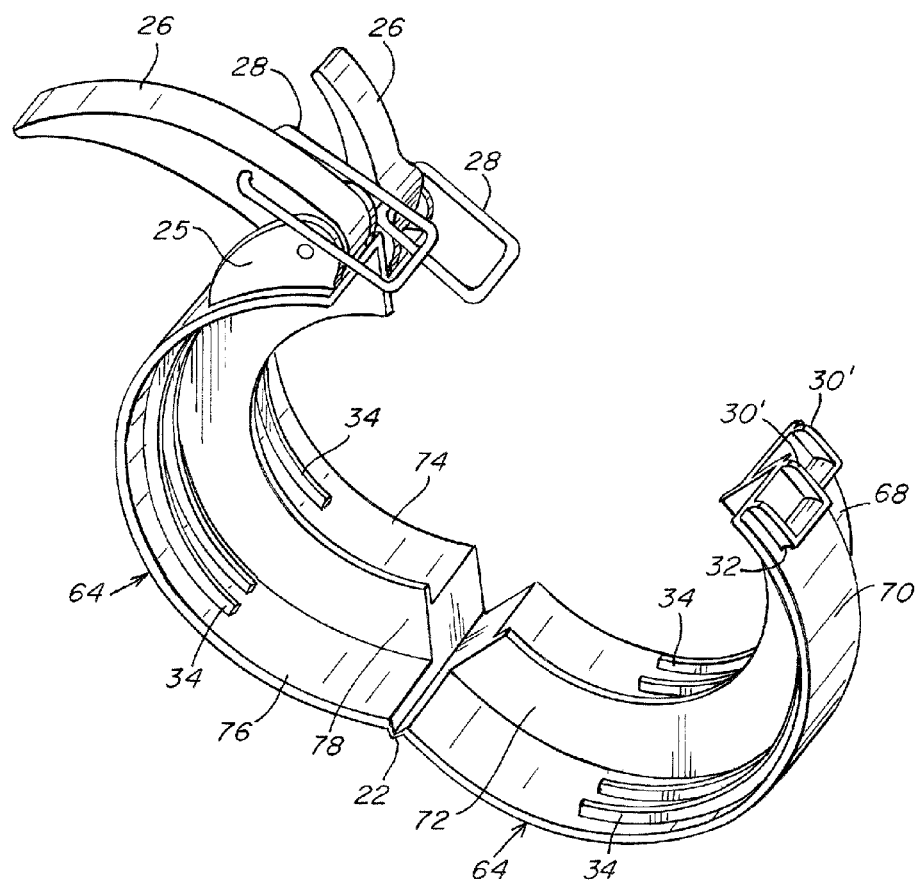
FIG. 9A is a perspective view of a modified embodiment of the connector of FIG. 9 wherein a living hinge is provided.

Referring now to FIGS. 9, 9A and 10, a second embodiment of a connector for connecting two conduits 6, 8 together, in particular conduits having different diameters, is designated generally as 62. The connector 62 includes a pair of generally semi-cylindrical members 64, 66 rotatably connected together at a first, coupled edge 64a, 66a and separable from one another at a second, free edge 64b, 66b. The semi-cylindrical members 64, 66 thus have an open position in which the second edges 64b, 66b are separated from one another (as shown in FIG. 9) and a closed position in which the second edges 64b, 66b are adjacent one another (as shown in FIG. 10).

The semi-cylindrical member 64 includes a first engagement portion 68 adapted to engage with the smaller conduit 6 and a second engagement portion 70 adapted to engage with the larger conduit 8. An arcuate lip 72 is formed between the engagement portions 68, 70 and is perpendicular to an axis passing through the connector 62. Similarly, the semi-cylindrical member 66 includes a first engagement portion 74 adapted to engage with the smaller conduit 6 and a second engagement portion 76 adapted to engage with the larger conduit 8. An arcuate lip 78 is formed between the engagement portions 74, 76 and is perpendicular to the axis passing through the connector 62. The arcuate lips 72, 78 limit the penetration of the larger conduit 8 into the connector 62.

In view of the relative size differential between the conduits 6, 8, first conduit engagement portions 68, 74 have a smaller radius of curvature than the second conduit engagement portions 70, 76. However, the ratio of the radii of curvature may vary depending on the size differential between the two conduits 6, 8 being coupled together by the connector 62.

In the exemplifying situation, the connector 62 would be used to couple a 3" diameter conduit to a 4" diameter conduit. The 3" conduit would be engaged with the engagement portions 68 and 74 while the 4" conduit would be engaged with the engagement portions 70 and 76.

In the embodiment shown in FIG. 9, the semi-cylindrical members 64, 66 are connected together by a hinge 16 (i.e., connected at the first edges 64a, 66a), which is described above. Thus, the first part 18 of the hinge 18 is arranged on or integrally formed in connection with the semi-cylindrical member 64 and the second part 20 of the hinge 18 is arranged on or integrally formed in connection with the semi-cylindrical member 66. To support the second hinge part 20, a flange 80 may be arranged on the outer surface of the first engagement portion 68 of the semi-cylindrical member 64 (see FIG. 9).

The semi-cylindrical members 64, 66 may also be integrally formed with a living hinge 22 as shown in FIG. 9A. Living hinge 22 may be formed at both conduit engagement portions 68, 70, 74, 76 as shown or, alternatively, at only one pair of conduit engagement portions 68 and 74 or 74 and 76.

FIG. 9A also shows a projection 30' which is slightly different than the projection 30 shown in FIG. 9. Although not shown, it is possible to provide axially extending ridges on the outer surface of the semi-cylindrical members 64, 66 and an extension portion alongside and contiguous with one or more of the engagement portions 68, 70, 74, 76.

The semi-cylindrical members 64, 66, with the hinge parts 18, 20 or living hinge 22, may be formed from a rigid material such as PVC, rubber or another suitable plastic material.

The connector 62 also includes the locking structure 24, described above, arranged on each associated pair of conduit engagement portions 68 and 74, 70 and 76. Alternatively, a locking structure 24 can be arranged on either the smaller conduit engagement portions 68 and 74 or the larger conduit engagement portions 70 and 76. For each locking structure 24, the pivoting lever 26 and connected tension lever 28 can be arranged on either semi-cylindrical member 64, 66 with the projection 30' on the other semi-cylindrical member 64, 66. Other locking structures to releasably lock the semi-cylindrical members 64, 66 together, as described elsewhere herein, may be used in the invention.

Locking flanges 34 are formed on the inner surfaces of the conduit engagement portions 68, 70, 74, 76 of the semi-cylindrical members 64, 66. The locking flanges 34 are designed to engage with grooves on the conduits 6, 8, when present, or engage with the outer surfaces of the conduits 6, 8 or other tubular components to frictionally engage with the same. Locking flanges 34 may be arranged at an angle or parallel to the axial ends of the connector 62.

To connect conduits 6, 8 together using the connector 62, the semi-cylindrical members 64, 66 are arranged in an unlocked configuration such as shown in FIG. 9 (or FIG. 9A). The conduits 6, 8 are then placed onto the locking flanges 34 on the semi-cylindrical member 64 and thereafter, the semi-cylindrical member 66 is brought into engagement with the conduits 6, 8 such that the locking flanges 34 of the semi-cylindrical member 66 contact the conduits 6, 8. The tension levers 28 of each locking structure 24 is then placed into the groove 32 of the respective projection 30' on the semi-cylindrical member 64. Each tension lever 26 is then pressed downward causing the free edges 64b, 66b of the semi-cylindrical members 64, 66 to move toward one another and lock the semi-cylindrical members 64, 66 together and thereby securely connect the conduits 6, 8 together (in the position shown in FIG. 10).

Figure 11:
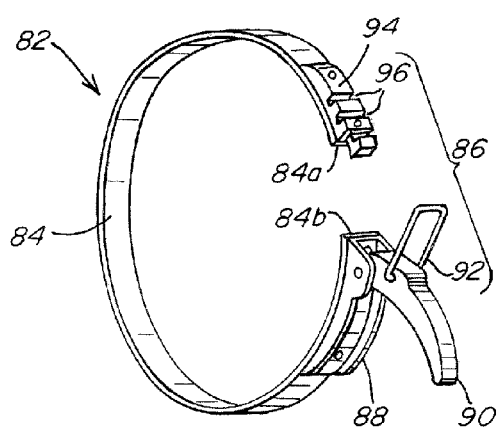
FIG. 11 is a perspective view of a flexible tie connector in accordance with the invention which may be used to attach a conduit to a vent of a dryer.
Figure 12:
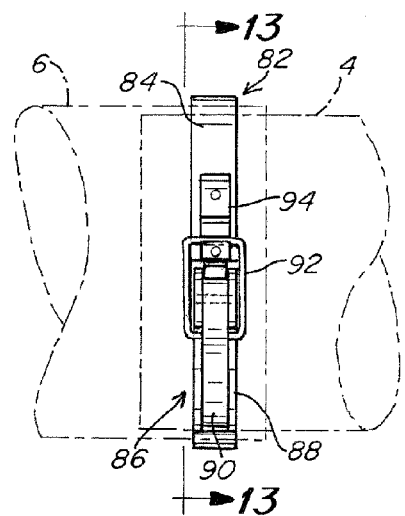
FIG. 12 is a side view of the flexible tie connector of FIG. 11 installed on a conduit and a vent of a dryer.
Figure 13:
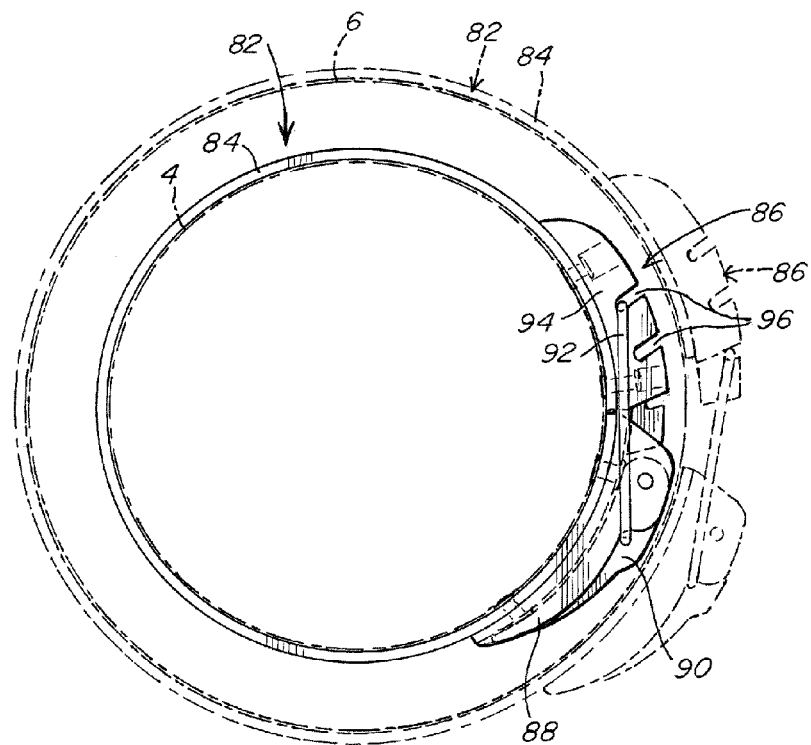
FIG. 13 is an end view of the flexible tie connector as seen along the line 13—13 of FIG. 12 installed on a 3" conduit (in solid lines) and on a 4" conduit (in phantom lines) to thereby show the ability of the tie connector to clamp conduits having different sizes.

Referring now to FIGS. 11–13, another embodiment of a connector clamp in accordance with the invention is designated generally as 82 and constitutes a flexible tie connector. Flexible tie connector 82 comprises an elongate strap 84 of flexible material which is capable of bending and stretching, such as rubber. A locking structure 86 is arranged at the free edges 84a, 84b of the strap 84 and to enable the free edges 84a, 84b of the strap 84 to be securely locked to one another. As such, the connector 82 may be used to connect two tubular components together, such as a conduit 6 to a dryer vent 4 as shown in FIG. 12.

The locking structure 86 includes a mounting bracket 88 attached to one free edge of the strap 84, e.g., by riveting, a pivotable locking lever 90 arranged on the mounting bracket 88 and a tension lever 92 connected to the locking lever 90. The locking structure 86 also includes a projection 94 attached to the other free edge of the strap 84, e.g., by riveting. Projection 94 includes a plurality of notches 96.

The mounting bracket 88, locking lever 90 and projection 94 may be formed of a rigid plastic such as PVC.

The locking lever 90 is designed to enable the tension lever 92 to engage with one of the notches 96 so that when the locking lever 90 is then pivoted toward and against the strap 84, the edges of the strap 84 are brought toward and against one another and locked together (see FIGS. 12 and 13). The locking of the edges of strap 84 can be released by lifting the locking lever 90 and then releasing the tension lever 92 from the notch 96. Other locking structures to releasably lock the edges 84a, 84b of the strap 84 together, such as disclosed elsewhere herein, may be used in the invention.

By providing a plurality of notches 96 and forming the strap 84 from a stretchable material, the connector 82 can be used to attach tubular components having different diameters together. For example, the strap can be used to attach two conduits having about a 3" diameter together (in solid lines in FIG. 13) or two conduits having about a 4" diameter together (in dotted lines in FIG. 13).

To connect the conduit 6 to the dryer vent 4, the conduit 6 is placed over the dryer vent 4 and the strap 84 is then placed around a portion of the conduit 6 over the dryer vent 4. The tension lever 90 is then placed into one of the notches 96 of the projection 94 and pressed downward causing the free edges 84a, 84b to move toward one another and be locked together. The conduit 6 is thereby securely connected to the dryer vent 4.

Figure 14:
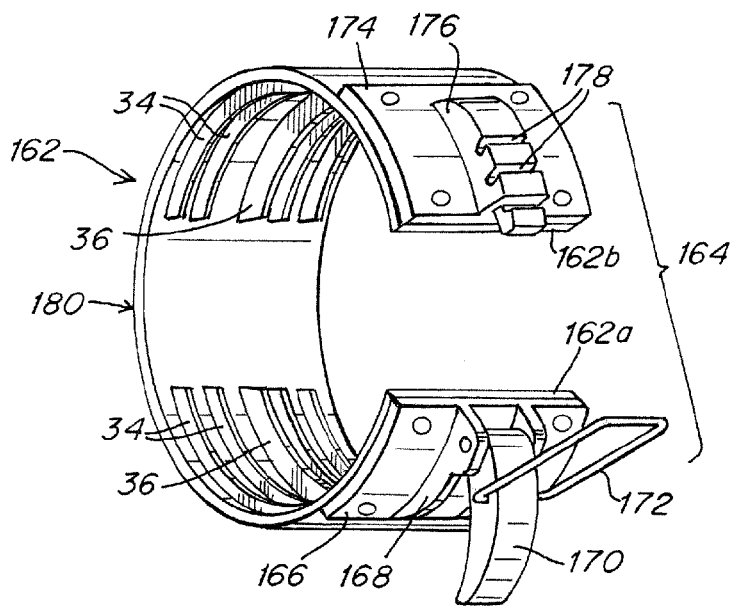
FIG. 14 is a perspective view of an alternate embodiment of a connector using a flexible body that bends and stretches.

Another connector 162 is shown in FIG. 14. Connector 162 is formed from a C-shaped piece of rubber 180, or other similar material, which is capable of acting as a hinge to enable the connector 162 to move between open and closed positions. In an open position as shown in FIG. 14, free edges 162a, 162b of the connector 162 are separated from one another to enable the connector 162 to be placed around two tubular components such as conduits to be connected together. In the closed position of the connector 162, the free edges 162a, 162b are adjacent one another.

The connector 162 includes a locking structure 164 arranged partially at each free edge 162a, 162b to lock the free edges 162a, 162 together. At free edge 162a, the locking structure 164 includes a rigid support platform 166 which has a mounting bracket 168, a pivotable locking lever 170 connected to the mounting bracket 168 and a tension lever 172 connected to the locking lever 170. At free edge 162b, the locking structure 164 includes a rigid support platform 174 and a projection 176 mounted on or formed integral with the platform 174.

Projection 176 includes a plurality of notches 178. By providing a plurality of notches 178 on the projection 176 and forming the connector 162 from a flexible material, the connector 162 can be used to attach tubular components having different diameters together. For example, the strap can be used to attach two conduits having about a 3" diameter together or two conduits having about a 4" diameter together.

The locking lever 170 is designed to enable the tension lever 172 to engage with one of the notches 178 so that when the locking lever 170 is then pivoted downward, the edges 162a, 162b of the connector 162 are brought toward and against one another and locked together. The locking of the edges 162a, 162b of the connector 162 can be released by lifting the locking lever 170 and then releasing the tension lever 172 from the notch 178.

Other locking structures to releasably lock the edges 162a, 162b of the connector locking structures to releasably lock the edges 162a, 162b of the connector 162 together, such as disclosed elsewhere herein, may be used in the invention.

The support platforms 166, 174 may be fixed to the rubber piece 180, e.g., by riveting. Also, the support platforms 166, 174, and optionally the locking lever 170 and the projection 176, may be formed of a rigid plastic such as PVC.

Connector 162 also optionally includes locking flanges 34 formed on the inner surface of the rubber piece 180 and a divider flange 36 formed on the inner surface of the rubber piece 180 axially between locking flanges 34. The structure and function of the locking flanges 34 and divider flange 36 are discussed above. The divider flange 36 divides the connector 162 into two component or conduit engagement portions, one on each side of the divider flange 36.

To connect tubular components together using the connector 162, the locking structure 164 is opened to provide the connector 162 with the form shown in FIG. 14. The tubular components are then engaged with the locking flanges 34 on the rubber piece 180, on a respective side of and optionally abutting against the divider flange 36. Thereafter, the tension lever 172 is placed into one of the notches 178 of the projection 176 and the locking lever 170 is pressed downward against the rubber piece 180 causing the free edges 162a, 162b of the rubber piece 180 to move adjacent one another and be locked together.

Figure 15:
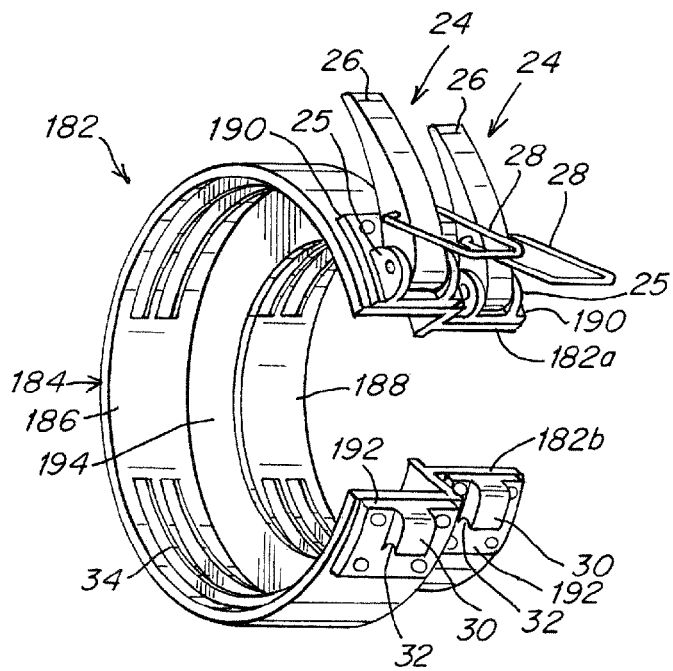
FIG. 15 is a perspective view of an alternate reducer connector in accordance with the invention.

Referring now to FIG. 15, this embodiment of a connector 182 is similar to those shown in FIGS. 9, 9A and 10 (and the same reference numerals will be used to designate the same or similar elements) except that instead of two semi-cylindrical members 64, 66, a single C-shaped member 184, i.e., a unitary piece of material, is provided which is capable of acting as a hinge to enable the connector 182 to move between open and closed positions. In an open position as shown in FIG. 15, free edges 182a, 182b of the connector 182 are separated from one another to enable the connector 182 to be placed around two tubular components such as conduits to be connected together. In the closed position of the connector 182, the free edges 182a, 182b are adjacent one another.

The C-shaped member 184 defines a large conduit engagement portion 186 and a small conduit engagement portion 188. An arcuate lip 194 is arranged between the conduit engagement portions 186, 188 and limits penetration of the large conduit into the connector 182.

The locking structure 24 described above is provided on both conduit engagement portions 186, 188, and differs from that shown in FIGS. 9 and 10 in view of the presence of support platforms 190 fixed at the free edge 182a and support platforms 192 fixed at the free edge 182b. Support platform 190 may be formed integral with the mounting bracket 25 and support platform 192 may be formed integral with the projection 30.

The support platforms 190, 192, mounting brackets 25, locking levers 26 and projections 30 may be formed of a rigid plastic such as PVC.

To connect conduits 6, 8 together using the connector 182, the locking structures 24 are opened to provide the connector 182 with the form shown in FIG. 15. The tubular components are then engaged with the locking flanges 34 on one side of the member 184, with the larger conduit optionally abutting against the arcuate lip 194. Thereafter, the tension levers 28 are placed into the grooves 32 of the projections 30 and the locking levers 26 are pressed downward against the member 184 causing the free edges 182a, 182b of the connector 182 to move adjacent one another and be locked together.

Described above are several variations of a connector for connecting tubular components together and several variations of a locking mechanism therefor. It is understood that the different constructions of the connectors may be used with any and all of the various locking mechanisms and vice versa, to the extent possible.

In addition, optional features, such as the sealing layer 23, may be included in any and all of the connectors described herein.

While the invention has been described above with respect to specific apparatus and specific implementations, it should be clear that various modifications and alterations can be made, and various features of one embodiment can be included in other embodiments, within the scope of the present invention.

I claim:

1. A connector for connecting a pair of tubular components together, comprising:

a pair of generally semi-cylindrical members each having a first edge and a second edge, said semi-cylindrical members being rotatably connected together at said first edges and separable from one another at said second edges to thereby provide said semi-cylindrical members with an open position in which said second edges are separated from one another and a closed position in which said second edges are opposite one another, each of said semi-cylindrical members including a first engagement portion adapted to engage with a first one of the tubular components and a second engagement portion adapted to engage with a second one of the tubula components, only one of said semi-cylindrical members including an extension portion contiguous with said first engagement portion and extending axially outward from said first engagement portion in a direction away from said second engagement portion to thereby provide said semi-cylindrical member with a larger axial length than the other of said semi-cylindrical members which lacks an extension portion and such that the first tubular component is bendable away from said extension portion; and locking means arranged in connection with said semi-cylindrical members for locking said semi-cylindrical members to one another with said second edges opposite one another, said first and second engagement portions having different radii of curvature to thereby enable tubular components having different diameters to be coupled together by the connector.

2. The connector of claim 1, further comprising a hinge for rotatably connecting said first edge of a first one of said semi-cylindrical members to said first edge of a second one of said semicylindrical members.

3. The connector of claim 2, wherein said hinge comprises a first hinge part arranged defining a pivot axis arranged on or integrally formed in connection with said first semi-cylindrical member and a second hinge part arranged on or integrally formed in connection with said second semi-cylindrical member, said second hinge part being rotatably mounted on the pivot axis defined by said first hinge part.

4. The connector of claim 2, wherein said hinge is a living hinge integrally formed in connection with said first and second semi-cylindrical members.

5. The connector of claim 1, wherein said locking means comprise a locking lever pivotally arranged on a first one of said semi-cylindrical members at said second edge of said first semi-cylindrical member, a tension lever connected to said locking lever, and a projection formed at said second edge of a second one of said semi-cylindrical members and including a groove, said locking lever being pivotable to enable said tension lever to enter into said groove.

6. The connector of claim 5, wherein said projection is formed on said second semi-cylindrical member.

7. The connector of claim 5, wherein said groove faces away from said second edge of said second semi-cylindrical member.

8. The connector of claim 1, wherein said locking means comprise a pair of hook-shaped locking projections arranged on a first one of said semi-cylindrical members and a channel arranged on an inner surface of a second one of said semi-cylindrical members and receivable of said locking projections.

9. The connector of claim 8, wherein said locking projections project outward from said second edge of said first semi-cylindrical member and are spaced apart from one another to enable them to flex relative to one another in order to be insertable into said channel.

10. The connector of claim 9, wherein said channel includes at least one pair of side recesses arranged such that rear-facing surfaces of said locking projections engage with said at least one pair of recesses.

11. The connector of claim 1, wherein said locking means comprise an outwardly oriented raised lip formed at said second edge of a first one of said semi-cylindrical members and an inwardly oriented raised lip formed at said second edge of a second one of said semi-cylindrical members, each of said lips having a sloping forward-facing surface and a planar rearward-facing surface which contact one another when said raised lips are in engagement with one another.

12. The connector of claim 1, wherein said locking means comprise a pair of hook-shaped locking projections arranged on a first one of said semi-cylindrical members and a cavity extending inward from an outer surface at said second edge of a second one of said semi-cylindrical members and receivable of said locking projections.

13. The connector of claim 12, wherein said locking projections project outward from said second edge of said first semi-cylindrical member and each includes an interior opening to provide flexibility upon insertion of said locking projections into said cavity.

14. The connector of claim 12, wherein said cavity is defined by opposed side walls, each of said side walls including at least one indentation arranged to engage with said locking projections.

15. The connector of claim 1, further comprising locking flanges formed on inner surfaces of at least one of said semi-cylindrical members, said locking flanges being adapted to engage with a tubular component.

16. The connector of claim 1, wherein each of said semi-cylindrical members includes an arcuate lip formed between said first and second engagement portions and perpendicular to an axis passing through the connector, said arcuate lips limiting penetration of a larger diameter one of the first and second tubular components into the connector.

17. The connector of claim 1, further comprising a hinge for rotatably connecting said second engagement portion of a first one of said semi-cylindrical members to said second engagement portion of a second one of said semi-cylindrical members, said hinge being the only hinge connecting said first and second semi-cylindrical members together.

18. The connector of claim 1, wherein said locking means comprise a looking lever pivotally arranged on only one of said first and second engagement portions of a first one of said semi-cylindrical members, a tension lever connected to said locking lever, and a projection formed on the respective one of said first and second engagement portions of a second one of said semi-cylindrical members, said projection including a groove, said locking lever being pivotable to enable said tension lever to enter into said groove.

19. The connector of claim 1, wherein said locking means comprise a locking lever pivotally arranged on each of said first and second engagement portions of a first one of said semi-cylindrical members, a tension lever connected to each of said locking levers, and a projection formed on each of said first and second engagement portions of a second one of said semi-cylindrical members, each of said projections including a groove, said locking levers being pivotable to enable said tension levers to enter into a respective one of said grooves on said projections.

20. The connector of claim 1, wherein said semi-cylindrical members are formed from a rigid material.

21. The connector of claim 1, wherein said locking means comprise a flange defining an opening and extending beyond said second edge of a first one of said semi-cylindrical members and a projection formed on an outer surface of a second one of said semi-cylindrical members at said second edge of said second semi-cylindrical member, said projection being receivable in said opening of said flange.

22. The connector of claim 21, further comprising a living hinge integrally formed with said first and second semi-cylindrical members for rotatably connecting said first edge of said first semi-cylindrical member and said first edge of said second semi-cylindrical member, said flange and said projection also being formed integral with said first and second semi-cylindrical members.

23. The connector of claim 21, wherein said projection includes an angled surface proximate said second-edge of said second semi-cylindrical member and said flange includes a lifting tab at an end apart from said first semi-cylindrical member.

24. The connector of claim 1, further comprising a sealing layer arranged to extend circumferentially over inner surfaces of said semi-cylindrical members.

25. The connector of claim 1, further comprising locking flanges formed on inner surfaces of said second engagement portions of said semi-cylindrical members.

26. The connector of claim 1, further comprising locking flanges formed on inner surfaces of at least one of said semi-cylindrical members, said locking flanges being adapted to engage with an outer surface of a tubular component.

27. The connector of claim 1, further comprising locking flanges formed on at least one inner surface of at least one of said semi-cylindrical members, said locking flanges being adapted to engage with an outer surface of a tubular component, said locking flanges being spaced apart from axial edges of said at least one of said semi-cylindrical members.

28. The connector of claim 1, wherein said second engagement portions have a larger radius of curvature than said first engagement portions, further comprising locking flanges formed on inner surfaces of only said second engagement portions.

29. A connector for connecting a pair of tubular components together, comprising:

a pair of generally semi-cylindrical members each having a first edge and a second edge, said semi-cylindrical members being rotatably connected together at said first edges and separable from one another at said second edges to thereby provide said semi-cylindrical members with an open position in which said second edges are separated from one another and a closed position in which said second edges are opposite one another; and locking means arranged in connection with said semi-cylindrical members for locking said semi-cylindrical members to one another with said second edges opposite one another, said locking means comprising a locking lever pivotally arranged on a first one of said semi-cylindrical members, a tension lever connected to said locking lever, and a projection formed on a second one of said semi-cylindrical members, said projection including a groove which faces away from said second edge of said second semi-cylindrical member, said locking lever being pivotable to enable said tension lever to extend beyond said second edge of said first semi-cylindrical member and to enter into said groove, each of said semi-cylindrical members including a first engagement portion adapted to engage with a first one of the tubular components and a second engagement portion adapted to engage with a second one of the tubular components, said first and second engagement portions having different radii of curvature to thereby enable tubular components having different diameters to be coupled together by the connector.

30. The connector of claim 29, further comprising a hinge for rotatably connecting said first edge of said first semi-cylindrical member to said first edge of said second semi-cylindrical member.

31. The connector of claim 30, wherein said hinge is a living hinge integrally formed in connection with said first and second semi-cylindrical members.

32. The connector of claim 29, further comprising locking flanges formed on inner surfaces of at least one of said semi-cylindrical members, said locking flanges being adapted to engage with a tubular component.

33. A connector for connecting a pair of tubular components together, comprising:

a pair of generally semi-cylindrical members each having a first edge and a second edge, said semi-cylindrical members being rotatably connected together at said first edges and separable from one another at said second edges to thereby provide said semi-cylindrical members with an open position in which said second edges are separated from one another and a closed position in which said second edges are opposite one another;

locking means arranged in connection with said semi-cylindrical members for locking said semi-cylindrical members to one another with said second edges opposite one another; and locking flanges formed on an inner surface of at least one of said semi-cylindrical members, said locking flanges being adapted to engage with an outer surface of a tubular component, said locking flanges being spaced apart from axial edges of said at least one of said semi-cylindrical members, each of said semi-cylindrical members including a first engagement portion adapted to engage with a first one of the tubular components and a second engagement portion adapted to engage with a second one of the tubular components, said first and second engagement portions having different radii of curvature to thereby enable tubular components having different diameters to be coupled together by the connector, said locking flanges being arranged on only said second engagement portions of said first and second semi-cylindrical members.

* * * * *